(12) United States Patent
Kim et al.

(10) Patent No.: US 11,180,408 B2
(45) Date of Patent: Nov. 23, 2021

(54) GLASS COMPOSITION

(71) Applicant: KCC CORPORATION, Seoul (KR)

(72) Inventors: Yongyi Kim, Gyeonggi-do (KR); Younmin Cho, Gyeonggi-do (KR); Seongyeob Yoo, Gyeonggi-do (KR)

(73) Assignee: KCC Glass Corporation, Seoul (KR)

( * ) Notice: Subject to any disclaimer, the term of this patent is extended or adjusted under 35 U.S.C. 154(b) by 182 days.

(21) Appl. No.: 16/090,139

(22) PCT Filed: Mar. 29, 2017

(86) PCT No.: PCT/KR2017/003426
§ 371 (c)(1),
(2) Date: Sep. 28, 2018

(87) PCT Pub. No.: WO2017/171403
PCT Pub. Date: Oct. 5, 2017

(65) Prior Publication Data
US 2019/0112221 A1   Apr. 18, 2019

(30) Foreign Application Priority Data

Mar. 30, 2016  (KR) .................. 10-2016-0038224

(51) Int. Cl.
*C03C 3/087* (2006.01)
*C03C 4/02* (2006.01)
*C03C 4/08* (2006.01)
*C03C 4/00* (2006.01)

(52) U.S. Cl.
CPC .............. *C03C 4/02* (2013.01); *C03C 3/087* (2013.01); *C03C 4/00* (2013.01); *C03C 4/08* (2013.01); *C03C 4/082* (2013.01); *C03C 4/085* (2013.01); *C03C 2201/42* (2013.01)

(58) Field of Classification Search
CPC .... C03C 4/00; C03C 4/02; C03C 4/08; C03C 4/082; C03C 4/085
See application file for complete search history.

(56) References Cited

U.S. PATENT DOCUMENTS

| | | |
|---|---|---|
| 3,652,303 A | 3/1972 | Janakirama Rao |
| 4,866,010 A | 9/1989 | Boulos et al. |
| 5,070,048 A | 12/1991 | Boulos et al. |
| 5,688,727 A | 11/1997 | Shelestak et al. |
| 6,544,915 B2 | 4/2003 | Nagashima |
| 6,596,660 B1 | 7/2003 | Boulos et al. |
| 6,673,730 B1 | 1/2004 | Shelestak |
| 6,849,566 B2 | 2/2005 | Shelestak et al. |
| 8,785,337 B2 | 7/2014 | Tsuzuki et al. |
| 8,785,338 B2 | 7/2014 | Tsuzuki et al. |
| 9,249,047 B2 | 2/2016 | Mitamura et al. |
| 2003/0050174 A1 | 3/2003 | Nagashima |
| 2004/0014587 A1* | 1/2004 | Shelestak ................ C03C 3/087 501/70 |
| 2004/0102304 A1 | 5/2004 | Boulos et al. |
| 2005/0170944 A1 | 8/2005 | Arbab et al. |
| 2007/0214833 A1 | 9/2007 | Arbab et al. |
| 2013/0105722 A1 | 5/2013 | Tsuzuki et al. |
| 2013/0264528 A1 | 10/2013 | Mitamura et al. |

FOREIGN PATENT DOCUMENTS

| | | |
|---|---|---|
| CN | 1336904 A | 2/2002 |
| CN | 1668543 A | 9/2005 |
| CN | 102917994 A | 2/2013 |
| CN | 103359931 A | 10/2013 |
| EP | 1002773 A1 | 5/2000 |
| JP | 2001192232 A | 7/2001 |
| JP | 2002160938 A | 6/2002 |
| JP | 2002338298 A | 11/2002 |
| JP | 2010037195 A | 2/2010 |
| JP | 2011251882 A | 12/2011 |
| JP | 2013209224 A | 10/2013 |
| WO | 2004009502 A1 | 1/2004 |

OTHER PUBLICATIONS

EP17775827.3 Extended European Search Report dated Mar. 15, 2019; 15 pgs.
PCT/KR2017/003426 International Search Report dated Aug. 18, 2017; 2 pgs.

* cited by examiner

*Primary Examiner* — Elizabeth A. Bolden
(74) *Attorney, Agent, or Firm* — Morgan, Lewis & Bockius LLP

(57) ABSTRACT

Embodiments relate to a glass composition which can allow for realizing beautiful bluish green colors therein even upon the use of a trace amount of a colorant such as Ti, Co, and Cr, securing high visible light transmittance suitable for window glass, and effectively reducing transmittance of solar heat radiation to help reduce a cooling load in buildings and vehicles.

11 Claims, No Drawings

GLASS COMPOSITION

CROSS-REFERENCE TO RELATED APPLICATIONS

This application claims the benefit of and priority to PCT/KR2017/003426, filed on Mar. 29, 2017, entitled (translation), "GLASS COMPOSITION," which claims the benefit of and priority to Korean Patent Application No. 10-2016-0038224, filed on Mar. 30, 2016, each of which is incorporated by reference in its entirety into this application.

BACKGROUND

Field

Embodiments relate to a glass composition.

Description of the Related Art

Embodiments relate to a glass composition used in the windows of buildings and the front or side windows of vehicles. Generally, glasses used for the windows of vehicles are required to have high visible light transmittance (Tvis.) for stably securing visibility and low solar heat radiation transmittance (Tds.) for user comfort. Also, if the glasses of vehicles are required to show bluish green color, it is required to meet the conditions on a certain main wavelength (Dw.) and excitation purity (Pe.).

As the conventional technique relating to blue and green colored glass composition, U.S. Pat. Nos. 3,652,303, 4,866,010 or 5,070,048 may be cited as examples. In these patent documents, iron or cobalt is used as a colorant included in a glass composition, and by controlling the content thereof, desired ultraviolet absorptivity or excitation purity is obtained. However, bluish green glass having high visible light transmittance and low solar heat radiation transmittance, while providing beautiful bluish green color that general consumers want, could not be provided.

Embodiments provide a glass composition achieving beautiful bluish green color of glass by controlling the amount of colorants such as Ti, Co and Cr, securing high visible light transmittance which is appropriate for a window glass, and effectively decreasing solar heat radiation transmittance.

The glass composition according to at least one embodiment is a soda-lime-silica glass composition and includes 0.5 to 1 wt % of a colorant including $Fe_2O_3$, based on 100 wt % of the glass composition, where the colorant including $Fe_2O_3$ further includes at least one colorant selected from the group consisting of $TiO_2$, CoO and $Cr_2O_3$, and the colorant including $Fe_2O_3$ further includes at least one colorant selected from the group consisting of 1 to 20 parts by weight of $TiO_2$, 0.01 to 0.2 parts by weight of CoO and 0.01 to 0.2 parts by weight of $Cr_2O_3$ based on 100 parts by weight of $Fe_2O_3$.

The glass composition according to various embodiments shows high visible light transmittance and low solar heat radiation transmittance when compared with the conventional colored glass which has the similar color, and has a main wavelength (Dw.) and excitation purity (Pe.) that may show beautiful bluish green color. That is, since the glass according to the composition of various embodiments may effectively prevent the heating by the solar heat radiation and the transmittance of ultraviolet rays, the cooling load of buildings and vehicles may be reduced. Also, people and interior materials in the buildings and vehicles may be protected from ultraviolet rays.

Hereinafter, embodiments will be explained in more detail.

The glass composition according to at least one embodiment is a soda-lime-silica glass composition and includes 0.5 to 1 wt % of a colorant including $Fe_2O_3$, based on 100 wt % of the glass composition, where the colorant including $Fe_2O_3$ further includes at least one colorant selected from the group consisting of $TiO_2$, CoO and $Cr_2O_3$, and the colorant including $Fe_2O_3$ further includes at least one colorant selected from the group consisting of 1 to 20 parts by weight of $TiO_2$, 0.01 to 0.2 parts by weight of CoO and 0.01 to 0.2 parts by weight of $Cr_2O_3$ based on 100 parts by weight of $Fe_2O_3$.

The colorant including $Fe_2O_3$ of the present invention may be included in an amount of 0.5 to 1 wt %, for example, 0.5 to 0.9 wt %, for example, 0.5 to 0.8 wt % based on 100 wt % of the glass composition.

The composition of the colorant according to various embodiments is embodied as follows.

According to at least one embodiment, iron (Fe) may be included as impurities in the major/minor materials of glass and is a component that may be present in glass to a degree of 0.1 to 0.2 wt % without additional input during common commercial production. The desired transmittance and color of most colored glasses are controlled by addition of iron, which may be added in forms of iron oxide ($Fe_2O_3$).

According to at least one embodiment, iron oxide is present in two types in glass, one is ferrous oxide (FeO), a reduced state, that gives blue color, and the other is ferric oxide ($Fe_2O_3$), an oxidized state, that gives yellow color. Iron oxide absorbs visible light and infrared rays in a reduced state, and absorbs visible light and ultraviolet rays in an oxidized state. Accordingly, if iron oxide is present, the transmittance of a glass product in the regions of visible light, infrared rays and ultraviolet rays may decrease.

Generally, a blue composition including ferrous oxide with a high concentration provides the decrease of visible light transmittance and excellent controlling performance of solar heat radiation transmittance, and gives glass with blue color. The concentration of ferrous oxide in glass is dependent on both the concentration of total iron and the oxidation-reduction ratio thereof. Accordingly, by keeping appropriate transmittances of visible light and solar heat radiation by controlling the amount of ferrous oxide in glass, beautiful bluish green feature may be secured.

Besides iron oxide, the improvement of the color of colored glass, the blocking of ultraviolet rays and the improvement of the absorption function of solar heat radiation may be achieved through the mixing of other diverse elements, and such elements include cobalt (Co), or selenium (Se), manganese (Mn), nickel (Ni), copper (Cu), chromium (Cr), titanium (Ti), cerium (Ce), or the like. These elements have inherent coloring effects and the absorption feature of ultraviolet rays and solar heat radiation. Such features are obtained due to the phenomenon of absorbing a specific wavelength of each element, and thus, desired color and transmittance may be designed by combining the elements added in an appropriate ratio. However, since elements such as cobalt (Co), selenium (Se), chromium (Cr) and titanium (Ti) have strong absorption coefficients and inhibit the coloring of beautiful bluish green, the amounts thereof added are required to be limited.

The total amount of $Fe_2O_3$ included in the composition according to various embodiments is 0.5 to 0.7 wt % per 100 wt % of the total soda-lime-silica glass composition. If the amount is greater than 0.7 wt %, the transmittance of visible light is extremely decreased and it is hard to use the composition in the window of vehicles and buildings. Also, the amount of $Fe^{2+}$ that absorbs radiated infrared rays increases and problems such as the decrease of the temperature at a lower part in a melting furnace may be induced during melting the composition. If the amount is less than 0.5 wt %, the transmittance of solar heat radiation increases, and effective decrease of the cooling load of buildings and vehicles may not be achieved. The total amount of $Fe_2O_3$ controlling the transmittance of visible light and the transmittance of ultraviolet rays and solar heat radiation of glass so as to be used as the windows for buildings and vehicles, may be, for example, 0.55 to 0.7 wt %, for example, 0.57 to 0.69 wt %.

According to at least one embodiment, the iron oxide added during the melting process of glass may be present as $Fe^{3+}$ and $Fe^{2+}$. $Fe^{3+}$ ions have weak absorption in a visible light region of 410 to 440 nm, and strong absorption edge near ultraviolet rays centering around 380 nm. Thus, the more the $Fe^{3+}$ ions are present, the more light yellow color of glass is shown. In addition, $Fe^{2+}$ ions have a strong absorption edge centering around 1050 nm and thus, are known to absorb infrared rays. With the increase of the $Fe^{2+}$ content, the color of glass changes into blue color. The presence ratio of such $Fe^{2+}/Fe^{3+}$ has a major influence upon a glass manufacturing process as well as the color of glass.

As discussed above, iron oxide is present in two types in a glass melt. Preferred oxidation-reduction ratio of a bluish green soda lime glass composition according to at least one embodiment may be 0.15 to 0.35, for example, 0.17 to 0.32, for example, 0.2 to 0.3. If the oxidation-reduction ratio is less than 0.15, the probability of the yellow coloring of glass increases, and if the oxidation-reduction ratio is greater than 0.35, the probability of the blue coloring of glass increases, and accordingly, it is difficult to achieve the feature of beautiful bluish green glass.

The term "oxidation-reduction ratio" used in the various embodiments means the weight ratio of ferrous oxide ($Fe^{2+}$ ion) represented by FeO with respect to the weight of total iron represented by an oxide, $Fe_2O_3$. Generally, this could be controlled by using an oxidizing agent such as sodium sulfate, which is an auxiliary agent for cleaning and melting, and a reducing agent such as coke.

The coloring agent including $Fe_2O_3$, that is included in the glass composition according to at least one embodiment may further include at least one colorant selected from the group consisting of $TiO_2$, CoO and $Cr_2O_3$, and the colorant selected from the group may be included in an amount of 0.01 to 20 parts by weight, for example, 0.02 to 18 parts by weight, for example, 0.04 to 15 parts by weight based on 100 parts by weight of $Fe_2O_3$. The elements such as cobalt (Co), chromium (Cr) and titanium (Ti) have strong absorptivity coefficient and may inhibit the coloring of beautiful bluish green color. Accordingly the amount thereof is required to be limited.

Cobalt (Co) is included in a composition as a cobalt oxide (CoO) type and supplied to a batch, or may be included as an impurity type from cullet. A $Co^{2+}$ type has absorption edges around 530, 590 and 645 nm. Due to the influence of such absorption edges, cobalt gives glass with deep blue.

According to at least one embodiment, the amount of CoO may be 0.01 to 0.2 parts by weight, for example, 0.02 to 0.18 parts by weight, for example, 0.04 to 0.15 parts by weight based on 100 parts by weight of $Fe_2O_3$. If the amount of CoO is greater than 0.2 parts by weight, glass shows deep blue color and the glass feature of beautiful bluish green color may not be achieved, the transmittance of visible light decreases, and thus, the glass is not appropriately used as the window of buildings or vehicles.

Chromium oxide ($Cr_2O_3$) gives glass with green color. Such chromium oxide is present in two types in the glass. $Cr^{3+}$ has absorption edges around 450 and 650 nm, and $Cr^{6+}$ has an absorption edge around 370 nm. Due to the influence of such absorption edges, chrome may give glass with deep green color.

According to at least one embodiment, the amount of $Cr_2O_3$ may be 0.01 to 0.2 parts by weight, for example, 0.02 to 0.18 parts by weight, for example, 0.04 to 0.15 parts by weight based on 100 parts by weight of $Fe_2O_3$. If the amount of $Cr_2O_3$ is greater than 0.2 parts by weight, glass shows deep green color and the glass feature of beautiful bluish green color may not be achieved, the transmittance of visible light decreases, and thus, the glass is not appropriately used as the window of buildings or vehicles.

Titanium dioxide ($TiO_2$) gives glass with yellow color. Such titanium dioxide is present in two types in the glass. $Ti^{3+}$ has an absorption edge around 540 nm, and $Ti^{4+}$ has an absorption edge around 300 nm. Due to the influence of such absorption edges, titanium may give glass with yellow color.

According to at least one embodiment, the amount of $TiO_2$ may be 1 to 20 parts by weight, for example, 3 to 18 parts by weight, for example, 5 to 15 parts by weight, particularly, 6 to 10 parts by weight based on 100 parts by weight of $Fe_2O_3$. If the amount of $TiO_2$ is greater than 20 parts by weight, glass shows yellow color, and the glass feature of beautiful bluish green color may not be achieved.

Meanwhile, the colorant is used in the above-mentioned amount range based on 100 wt % of the soda-lime-silica glass composition, and the major constituent components of the soda-lime-silica glass composition have the component ranges listed in Table 1 below.

TABLE 1

| Component | Amount (wt %) |
|---|---|
| $SiO_2$ | 65-75 |
| $Al_2O_3$ | 0.3-3.0 |
| $Na_2O + K_2O$ | 10-18 |
| CaO | 5-15 |
| MgO | 1-7 |

According to at least one embodiment, $SiO_2$ plays the role of a forming agent of a network structure which forms the basic structure of glass. If the amount is less than 65 wt %, there is a problem with the durability of glass, and if the amount is greater than 75 wt %, a viscosity at a high temperature increases and melting properties are degraded. According to at least one embodiment, $Al_2O_3$ increases the viscosity at a high temperature of glass and is a component improving the durability of glass with a small amount added. If the amount is less than 0.3 wt %, chemical resistance and water resistance may become vulnerable, and if the amount is greater than 3 wt %, the viscosity at a high temperature increases and melting load increases.

$Na_2O$ and $K_2O$ are flux components that promote the melting of a glass material. If the total amount of the two components is less than 10 wt %, the production of an unmelted product increases, and the quality of melting may be degraded, and if the amount is greater than 18 wt %, chemical resistance may be degraded.

CaO and MgO are components assisting the melting of a raw material and reinforcing the climate resistance of a glass structure. If the amount of CaO is less than 5 wt %, durability may be degraded, and if the amount is greater than 15 wt %, crystallization tendency increases and the product quality may be adversely affected. In addition, if the amount of MgO is less than 1 wt %, the aforementioned effects may decrease, and if the amount is greater than 7 wt %, crystallization tendency increases, and the increase of crystal defects is induced.

Bluish green soda lime glass manufactured using the composition according to at least one embodiment may be applied as safety glass for vehicles, and in addition, may be applied as the window glass of buildings. The safety glass for vehicles may be applied as the visible panel of front surface, side surface and rear surface, but the use thereof is not limited thereto. In order to usefully use such bluish green soda lime glass component to the window of vehicles and buildings, optical properties are required as follows.

Based on glass with a thickness of 4 mm, the visible light transmittance (Tvis.) may be 75% or more. If the visible light transmittance is less than 75%, the visibility secure for observing outside may become difficult, and the application of the bluish green soda lime glass to the window of buildings may be limited. Particularly, big problems may arise in parts requiring visibility such as the visible panel of front, side and rear surfaces among safety glass for vehicles.

In addition, in order to save the cooling load of buildings and vehicles, based on glass with a thickness of 4 mm, the solar heat radiation transmittance (Tds.) may be 56% or less. If the solar heat radiation transmittance is greater than 56%, the temperature increase in vehicles and buildings by solar heat may not be effectively restrained.

The bluish green soda lime glass manufactured by the glass composition according to at least one embodiment may have a main wavelength (Dw.) of 493 nm to 503 nm and excitation purity (Pe.) of 0.5 to 7%. If control within these ranges fails, blue or green color may be strongly developed, and the deep color of beautiful bluish green color required in the present invention may not be kept.

Hereinafter, embodiments will be explained in more detail referring to examples and comparative examples. However, the scope of the various embodiments is not limited thereto.

EXAMPLES

The glass melts described in all examples and comparative examples were prepared according to the procedure as follows.

In manufacturing a glass melt, components were weighed and mixed in a mixer.

As raw materials, silica, feldspar, lime stone, dolomite, soda ash, sodium sulfate and iron oxide were used, and glass batches of which mixing ratios were controlled to obtain target compositions referred in the examples and the comparative examples below, were molten using a gas furnace or an electrical furnace. A soda lime glass composition constituted of 71.0% of $SiO_2$, 1.3% of $Al_2O_3$, 9.8% of CaO, 3.8% of MgO, 13.9% of $Na_2O$, 0.15% of $K_2O$ and 0.2% of $SO_3$, based on the wt % of a mother glass composition excluding a colorant in the glass composition, was used.

500 g of the weighed mixture was put in a 90% platinum/10% rhodium crucible, and molten in a gas furnace at 1450° C. for 1 hour and then rapidly cooled to recover a glass powder. After that, melting in an electrical furnace at 1450° C. for 1 hour was repeated twice to manufacture a sample with improved homogeneity. In addition, a sample for measuring the number of remaining bubbles, i.e., for evaluating melting quality was manufactured using a cylindrical alumina crucible having a diameter of 5 cm and a height of 10 cm, by weighing, based on 500 g, the same batch as the sample manufactured for the chemical component analysis and optical property evaluation of the glass composition, and melting the same in a gas furnace for 3 hours.

Based on 100 wt % of the mother glass composition, the amounts of the colorant referred in the examples and the comparative examples were added, the glasses thus manufactured were cast molded using a graphite plate, and sample glasses were processed into a thickness of 4 mm. The chemical components and spectroscopic properties of the glass composition were measured as follows.

The chemical analysis of the glass composition was conducted using 3370 X-ray fluorescence measuring apparatus (XRF) of RIGAKU Co.

Visible light transmittance was measured using HUNTER LAB by CIE 1931 Yxy/2 chromaticity diagram vision (light source A).

Solar heat radiation transmittance was measured according to ISO 13837 regulation by using Perkin Elmer Lambda 950 spectrophotometer.

The main wavelength and excitation purity were measured using HUNTER LAB colorimeter apparatus by CIE 1931 Yxy/2 chromaticity diagram vision (light source C).

The amount of the colorant and the optical property values thus measured are listed in Table 2 and Table 3 below.

TABLE 2

| Division | Component | Example 1 | 2 | 3 | 4 | 5 | 6 | 7 | 8 |
|---|---|---|---|---|---|---|---|---|---|
| Colorant | $Fe_2O_3$ (wt %) | 0.62 | 0.63 | 0.59 | 0.57 | 0.69 | 0.62 | 0.63 | 0.64 |
|  | $TiO_2$ | 6.45 | 0 | 0 | 7.02 | 11.59 | 8.06 | 12.70 | 9.38 |
|  | CoO | 0 | 0.10 | 0 | 0 | 0.07 | 0.05 | 0 | 0 |
|  | $Cr_2O_3$ | 0 | 0 | 0.13 | 0 | 0 | 0.06 | 0 | 0 |
| Oxidation-reduction ratio | FeO/total $Fe_2O_3$ | 0.27 | 0.27 | 0.27 | 0.27 | 0.27 | 0.28 | 0.30 | 0.22 |
| Optical properties | Tvis. | 77.7 | 77.1 | 79.1 | 79.5 | 76.1 | 77.3 | 76.2 | 79.5 |
|  | Tds. | 53.3 | 52.4 | 54.5 | 54.9 | 50.9 | 52.4 | 50.6 | 54.9 |
|  | Dw. | 496.1 | 491.9 | 501.9 | 500.3 | 494.7 | 493.7 | 493.0 | 500.4 |
|  | Pe. | 3.1 | 4.4 | 2.2 | 2.4 | 4.4 | 3.8 | 4.1 | 2.4 |

TABLE 3

| Division | Component | Comparative Example | | | | | | | | |
|---|---|---|---|---|---|---|---|---|---|---|
| | | 1 | 2 | 3 | 4 | 5 | 6 | 7 | 8 | 9 |
| Colorant | $Fe_2O_3$ (wt %) | 0.46 | 0.73 | 0.75 | 0.58 | 0.62 | 0.69 | 0.67 | 0.66 | 0.74 |
| | $TiO_2$ | 10.87 | 0 | 26.67 | 8.62 | 0 | 43.48 | 5.97 | 6.06 | 6.76 |
| | CoO | 0 | 0 | 0 | 0.26 | 0 | 0 | 0 | 0 | 0 |
| | $Cr_2O_3$ | 0 | 0 | 0 | 0 | 0.56 | 0 | 0 | 0 | 0 |
| Oxidation-reduction ratio | FeO/total $Fe_2O_3$ | 0.27 | 0.29 | 0.29 | 0.3 | 0.25 | 0.23 | 0.4 | 0.13 | 0.29 |
| Optical properties | Tvis. | 82.3 | 73.9 | 73.3 | 76.6 | 78.9 | 78.8 | 68.7 | 83.8 | 73.7 |
| | Tds. | 58.4 | 47.7 | 47 | 52.4 | 54.9 | 54.1 | 40.9 | 60.1 | 47.4 |
| | Dw. | 529 | 489.9 | 491.7 | 489.3 | 521.4 | 526.6 | 486.8 | 539.8 | 490.3 |
| | Pe. | 1.8 | 5.8 | 5 | 5.6 | 1.7 | 1.9 | 9.4 | 2.6 | 5.5 |

The amount of $Fe_2O_3$ means wt % based on 100 wt % of the glass composition, and the amounts of $TiO_2$, CoO and $Cr_2O_3$ mean parts by weight based on 100 parts by weight of $Fe_2O_3$.

As known in Table 2, Examples 1 to 8, which are the glass products according to the present invention, were found to provide soda lime glass compositions with high visible light transmittance, low solar heat radiation transmittance and beautiful bluish green color.

Particularly, Example 1 and Comparative Example 1 showed similar oxidation-reduction ratios, but Comparative Example 1 had lower total amount of $Fe_2O_3$ than the present invention. Accordingly, Example 1 showed lower solar heat radiation transmittance than Comparative Example 1, and had a main wavelength (Dw.) in a range of 493 nm to 503 nm.

In addition, Examples 2, 6, 7 and 8 and Comparative Example 5 had similar total amount of $Fe_2O_3$, but Comparative Example 5 had excessive amount of $Cr_2O_3$ and developed green color with a high main wavelength range (>503 nm). On the contrary, Examples 2, 6, 7 and 8 had the amount of each colorant in the numerical range of the present invention and satisfied the main wavelength range of 493 nm to 503 nm.

Examples 3 and 4 and Comparative Example 4 had similar total amount of $Fe_2O_3$, and Example 5 and Comparative Examples 6, 7 and 8 had similar total amount of $Fe_2O_3$. However, the CoO amount for Comparative Example 4, the $TiO_2$ amount for Comparative Example 6, and the oxidation-reduction ratios for Comparative Examples 7 and 8 were deviated from the numerical ranges of the present invention. Accordingly, the main wavelength range was deviated from 493 nm to 503 nm.

If examining each comparative example in particular, Comparative Examples 1 to 3 showed examples deviated from the amount range of $Fe_2O_3$ suggested in the present invention. Particularly, Comparative Example 1 corresponded to a case where the amount of $Fe_2O_3$ was excessively small and showed high solar heat radiation transmittance (>56%) and high main wavelength (>503 nm). In addition, Comparative examples 2 and 3 corresponded to cases where the amount of $Fe_2O_3$ was excessively large and thus, had low visible light transmittance (<75%) and low main wavelength (<493 nm).

Comparative Example 4 corresponded to a case where the amount of CoO was excessively large, and thus, developed strong blue color and had a main wavelength in a low range (<493 nm). Comparative Examples 5 and 6 corresponded to cases where the amount of $Cr_2O_3$ or $TiO_2$ was excessively large, and thus, developed strong green color and yellow color and had a main wavelength in a high range (>503 nm).

Comparative Examples 7 and 8 were secured to have oxidation-reduction ratios (FeO/total $Fe_2O_3$) deviated from the suggested configuration of the present invention. Particularly, Comparative Example 7 corresponded to a case where the reduction ratio was excessively large, and thus, showed low visible light transmittance (<75%), a main wavelength in a low range (<493 nm), and excessive excitation purity (>7%). Comparative Example 8 corresponded to a case where the reduction ratio was excessively small, and thus, showed high solar heat radiation transmittance (>56%), and a main wavelength in a high range (>503 nm).

The invention claimed is:

1. A soda-lime-silica glass composition comprising
   65 to 75 wt % of $SiO_2$,
   0.3 to 3.0 wt % of $Al_2O_3$,
   10 to 18 wt % of $Na_2O$ and $K_2O$,
   5 to 15 wt % of CaO,
   1 to 7 wt % of MgO, and
   0.5 to 1 wt % of a colorant, based on 100 wt % of the glass composition, the colorant comprising 100 parts by weight of $Fe_2O_3$, 0.01 to 0.2 parts by weight of $Cr_2O_3$, and at least one compound selected from the group consisting of 1 to 20 parts by weight of $TiO_2$ and 0.01 to 0.2 parts by weight of CoO,
   wherein the glass composition has 0.5 to 0.69 wt% $Fe_2O_3$ based on 100 wt% of the glass composition, and
   a glass manufactured using the glass composition shows, on the basis of the thickness of the glass of 4 mm, optical properties including visible light transmittance (Tvis.) of 75% or more, and solar heat radiation transmittance (Tds.) of 56% or less.

2. The glass composition according to claim 1, wherein the glass composition comprises $Fe_2O_3$ in an amount of 0.57 to 0.69 wt %.

3. The glass composition according to claim 1, wherein $Fe_2O_3$ has an oxidation-reduction ratio of 0.15 to 0.35.

4. The glass composition according to claim 1, wherein $Fe_2O_3$ has an oxidation-reduction ratio of 0.2 to 0.3.

5. The glass composition according to claim 1, wherein the colorant comprises $TiO_2$.

6. The glass composition according to claim 1, wherein the colorant comprises 6 to 10 parts by weight of $TiO_2$ based on 100 parts by weight of $Fe_2O_3$.

7. The glass composition according to claim 1, wherein the colorant comprises CoO.

8. The glass composition according to claim 1, wherein the colorant comprises 0.04 to 0.15 parts by weight of CoO based on 100 parts by weight of $Fe_2O_3$.

9. The glass composition according to claim 1, wherein the colorant comprises 0.04 to 0.15 parts by weight of $Cr_2O_3$ based on 100 parts by weight of $Fe_2O_3$.

10. The glass composition according to claim 1, wherein the composition comprises, based on wt% of a mother glass composition, 71.0% of $SiO_2$, 1.3% of $Al_2O_3$, 9.8% of CaO, 3.8% of MgO, 13.9% of $Na_2O$, 0.15% of $K_2O$, and 0.2% of $SO_3$, the mother glass composition excluding a colorant in the glass composition.

11. The glass composition according to claim 1, wherein a glass manufactured using the glass composition shows a main wavelength (Dw.) of 493 nm to 503 nm, and excitation purity (Pe.) of 0.5 to 7%.

* * * * *